Patented Aug. 18, 1936

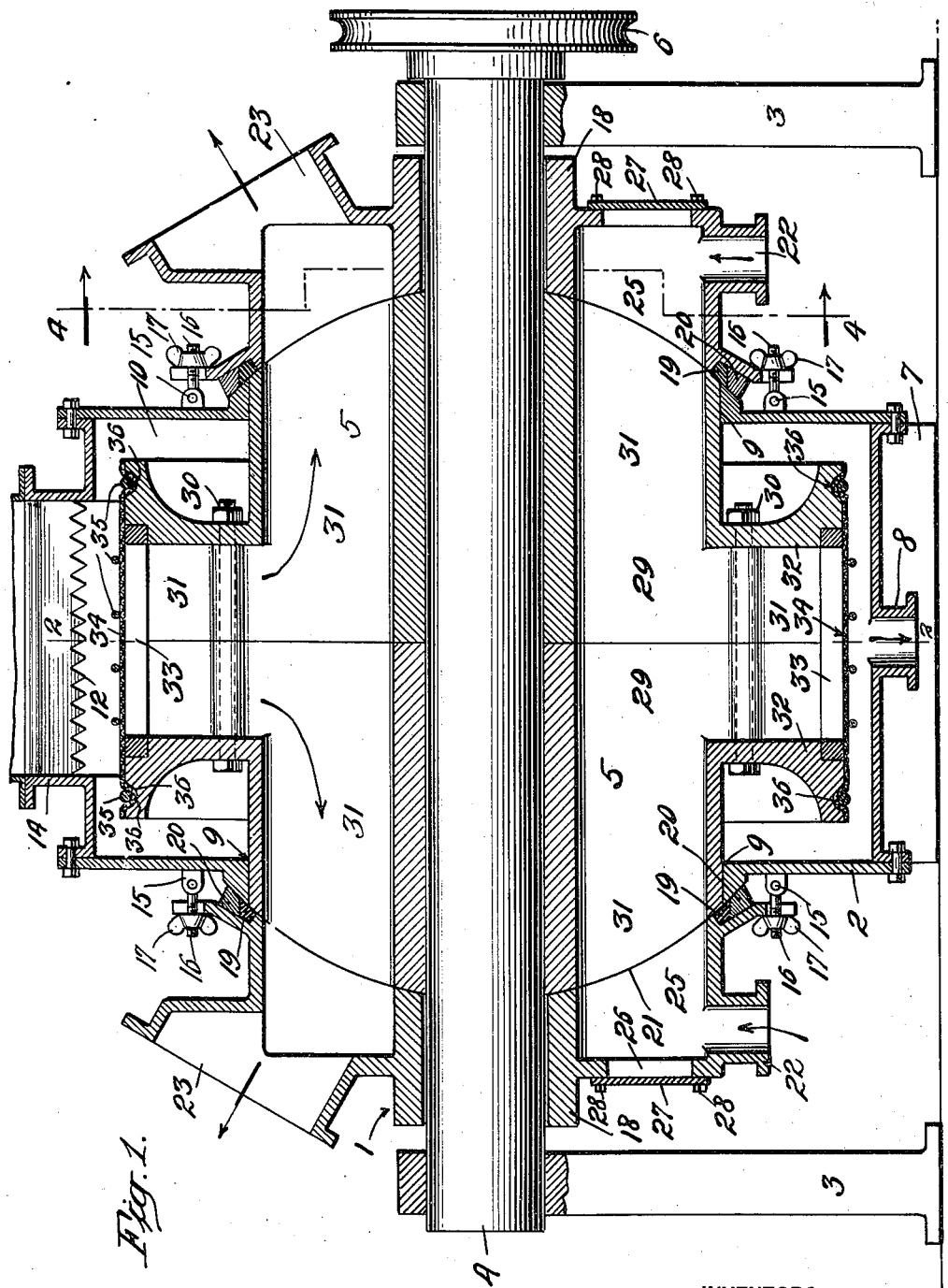

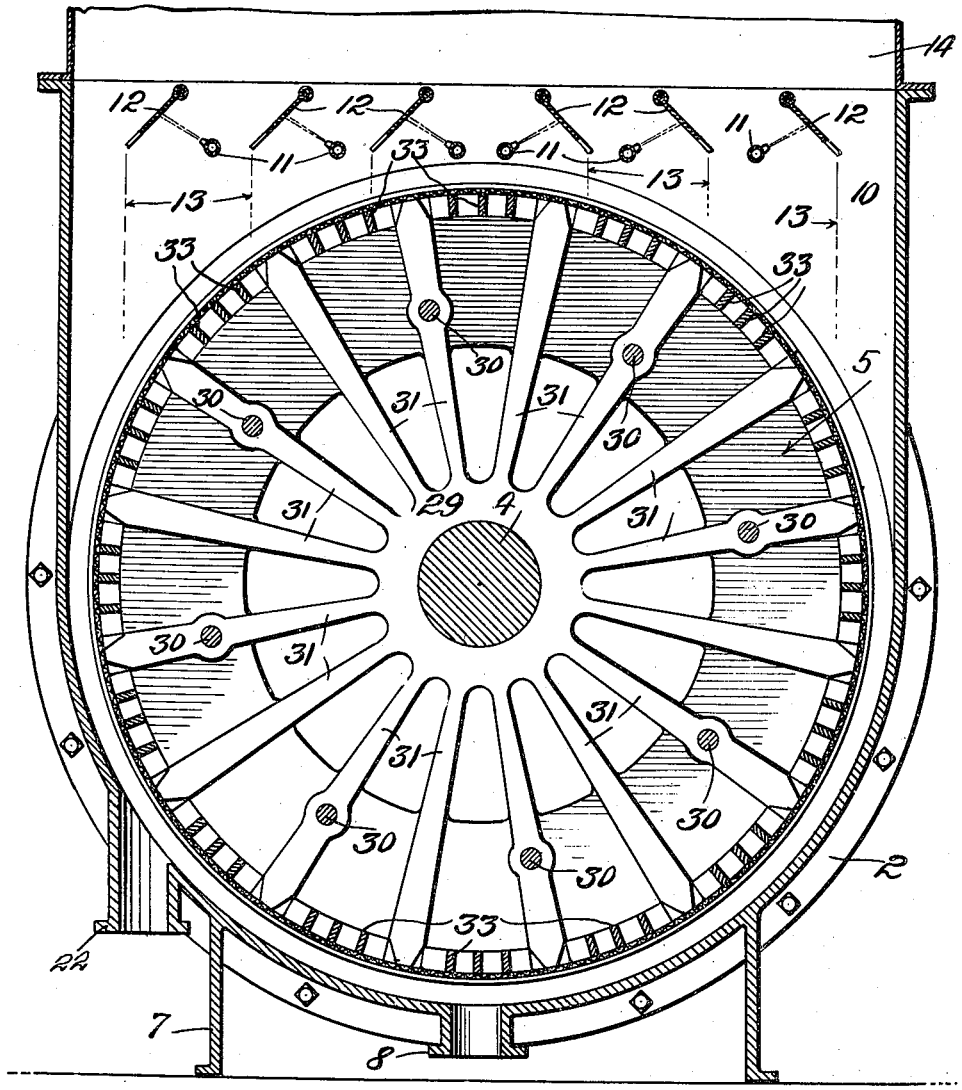

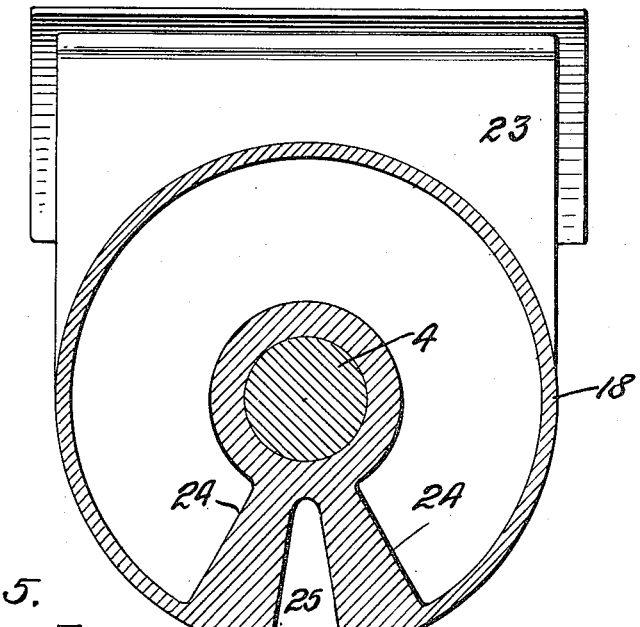
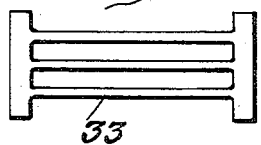
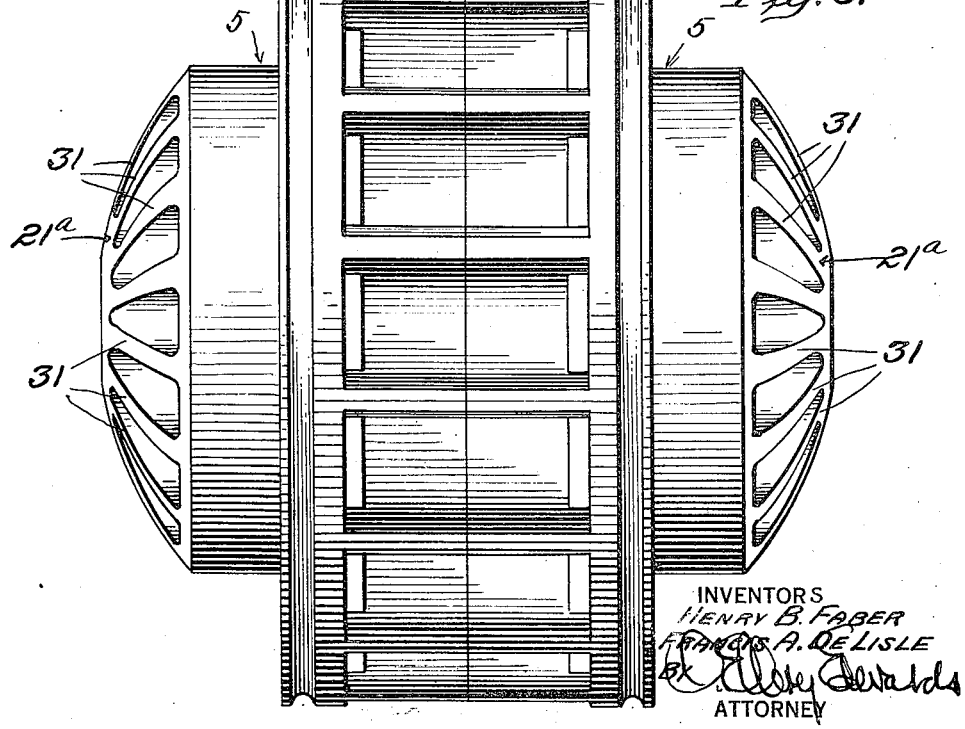

2,051,079

UNITED STATES PATENT OFFICE 2,051,079

FILTER

Henry B. Faber, Brooklyn, and Francis A. De Lisle, New York, N. Y.

Application April 14, 1932, Serial No. 605,176

8 Claims. (Cl. 210—199)

The object of our invention is to provide a filter with a rotor moving continuously in an angular direction and receiving fluid material with solids, either hot or cold, and separating the solids from the fluid, by first exerting a suction through a filter pad to separate and retain the solids, and later putting pressure on the interior of the filter pad to force the solids off.

A further object of our invention is to provide suitable provision for expansion and contraction so that large passages may exist for all matter passing through the filter, except at the filter pad where the passages through the pad are sufficiently small to retain the solids.

These and other objects are accomplished by our invention, one embodiment of which is hereinafter more particularly set forth.

For a more detailed description of our invention, reference is to be had to the accompanying drawings, forming a part hereof, in which Figure 1 is a longitudinal section of a machine embodying our invention;

Figure 2 is a cross section of our improved filter taken on the line 2—2 of Figure 1;

Figure 3 is a side elevation of the rotor of the machine with certain parts removed;

Figure 4 is a sectional view taken on the line 4—4 of Figure 1, looking in the direction of the arrows; and Figure 5 is a plan view of a grate which is placed underneath a filter pad.

Throughout the various views of the drawings, similar reference characters designate similar parts.

Our improved filter 1 has a fixed body 2 and two pedestals 3 at the top of which are bearings for a shaft 4 carrying the rotor 5 of this machine. The rotor is driven by a suitable pulley 6 or any other suitable means, and preferably at a slow speed, say two or three revolutions a minute. The body 2 is mounted on a suitable support 7 and is provided with a pipe connection 8 at its lowest point through which it may be drained. It is also provided with a cylindrical bearing 9 which carries the rotor in a manner which will be described below.

At its top is a chamber 10 which is provided with a number of spraying devices 11 which throw water against spreaders 12 set at any suitable angle and provided with serrated edges so as to produce curtains of moisture 13 which thoroughly wash the atmosphere at the intake 14 at the top of the frame. This stationary frame 2, on its exterior and about the bearings 9, carries a number of ears 15 in which are pivotally supported suitable bolts 16 with wing nuts 17 and these hold the partioned face plates 18 in rigid connection with the frame 2. To prevent leakage, a suitable packing 19 is employed near the bolts 16 and this packing is held in place by a suitable packing ring 20, so as to make a tight joint between the parts 18 and 2.

The face plates 18 have a suitable boring through which the shaft 4 passes, and each has a spherical seat 21 to engage a corresponding seat 21a on the rotor 5 which will be described below. Each face plate has large passages which register with coresponding passages in the rotor. At the bottom of each face plate 18 is an inflow opening 22, and at the top an outflow opening 23, and the opening 22 has certain boundary partitions 24 (see Figure 4), which form a passage 25 between them.

This passage 25 has ample capacity to permit an inflow of cleansing water as will appear below. This water is under pressure while the space beyond the partitions 24 is under a partial vacuum. A suitable hand hold opening 26 is provided opposite the passage 25 and this opening is normally covered by a cover 27 held by suitable bolts 28 in the conventional way.

The rotor 5 is composed of two identical castings 29 united by tie bolts 30 which pass through partitions 31 which are radially disposed (see Figure 2) so as to separate the interior of the rotor into a number of radial compartments, i. e., the part nearest the axis, they are the same size as the passages 25 and the spaces of these passages, or these gorges, are smaller than the partitions 24 so that only one gorge will be opposite a passage 25 at one time, as it would not be desirable to have suction come in contact with pressure.

The partitions 31 have spherical outer ends 21a which engage with a tight fit the surfaces 21 of the face plates 18. This is important because the joints between the parts 21 and 31 must be true and good at all temperatures as well as the joints at the packings 19, and the radial expansion which occurs in all parts under temperature influences takes place in such a manner that there is no leakage in the structure here involved, so that the passages for the inflow and outflow for fluids are ample and not restricted regardless of the size of the apparatus.

Heretofore such machines have been built with pipes about the hub of a rotor, and these pipes were necessarily restricted in diameter with the result that the usefulness of the machine as well as its size was seriously impaired. Here, as above pointed out, large openings are provided in the machine, and the machine may be made in any size.

The periphery of the rotor 5 has flanged collars 32 recessed to receive grates 33 (see Figure 5) and over these grates is placed the filter pad 34 which is held by wires 35, or other suitable means, and one of these wires, at each side, rests in a groove 36 in the collar 32.

Operation

In view of the foregoing, the operation of our improved filter will be readily understood.

The fluid with solids to be filtered out of the fluid, whether hot or cold, comes in through the pipe connection 14, and suction together with the spray from the nozzles 11 causes the solids to adhere to the pad 34 and the filtered fluid passes out through the suction at the large ports 23, leaving the solids adhering to the exterior of the filter pad, where they remain until opposite the passage 25 where there is an inrush of water or other fluid under pressure, which strikes the interior of the filter pad 34 and passes through the same so as to expel the solids from the pad and permit them to be washed to the bottom of the apparatus and out through the outflow pipe 8. Any surplus water that does not pass through the filter pad 34 will also find its way to this sump at the bottom so that it will pass out through the passage 8.

The operation, above described, is not quite continuous as to the removal of the solids from the exterior of the filter pad 34 because this removal occurs only when a space between the partitions 31 registers with a passage 25, but this is almost continuous. There is no suction or expulsion.

While we have shown and described one embodiment of our invention, it is obvious that it is not restricted thereto, but that it is broad enough to cover all structures that come within the scope of the annexed claims.

Having thus described our invention, what we claim is:

1. A rotor for filtering machines composed of two castings bolted together with integrally formed passages and chambers, and spherical seats at each end.

2. A filter having a fixed casing, a rotor with integrally formed chambers and passages fitting therein, and a ball and socket joint between the casing and rotor, so that expansions and contractions due to temperature changes will not affect the tightness of the joint between them.

3. A filter comprising a casing, a solid and imperforate shaft rotatably mounted in said casing, a rotor having chambers and passages therein mounted on said shaft, a filter pad associated with said rotor, a ball and socket joint between said casing and rotor so that expansions and contractions due to temperature changes will not effect the tightness of the joint between them, means for creating a suction in some of said chambers and means for forcing a fluid under pressure through another chamber to expel the filtered matter.

4. A filter which comprises a fixed casing, a rotor having chambers and passages therein, a ball and socket joint between said casing and rotor so that expansions and contractions due to temperature changes will not effect the tightness of the joint between them, a filter pad on the periphery of said rotor, means for causing suction in some of said chambers and passages, and means for forcing a fluid under pressure through another set of said chambers and passages whereby solids may be deposited on a filter pad and the filtered fluid removed.

5. A filter comprising a fixed casing, a substantially solid and practically imperforate shaft rotatably mounted in said casing, a rotor having radial chambers and passages therein and rounded ends mounted on said shaft, a filter pad associated with said rotor, concave seats in said casing adapted to receive the rounded ends of the rotor and to form a fluid-tight joint therewith, a passage in the casing adapted to register with at least one of said radial passages in the rotor whereby fluid under pressure may be introduced to said registering passages to backwash a portion of said filter pad, and means for creating a differential of pressure in the other passages and chambers whereby solids may be deposited on the periphery of the rotor and the filtered fluid removed.

6. A filter comprising a casing having concave seats, a substantially imperforate shaft rotatably mounted in said casing, a rotor having rounded ends mating with the said seats mounted on said shaft, said rotor having radial chambers and passages therein, a filter pad associated with the periphery of said rotor, inlet and outlet ports in said casing adapted to simultaneously register with a plurality of said passages for introducing liquid from the casing to the said chambers and passages and to discharge filtered liquid therefrom, and a passage located in the casing adapted to register with a single passage in the rotor to introduce backwash liquid under pressure to remove solids deposited on said filter pad.

7. A filter comprising a casing, a substantially imperforate shaft rotatably mounted in said casing, a rotor having chambers and passages therein mounted on said shaft within said casing, a fluid-tight ball and socket joint between said casing and rotor, a filtering pad mounted around the periphery of said rotor, a port of entry and a port of discharge located in the casing adapted to simultaneously introduce under a differential of pressure liquid to be filtered into a plurality of said chambers and passages and to discharge filtered liquid therefrom through said ball and socket joint, and another port of entry in said casing adapted to register with the remaining set of said chambers and passages through said ball and socket joint to introduce backwash fluid under pressure to wash away and to remove solids which have collected on the filter pad.

8. A filter comprising a rotor having a plurality of radial passages, curved seats at each end of said rotor, a filter associated with the periphery of said rotor, a casing having mating sockets adapted to receive said seats and to form a fluid tight joint therewith, a substantially imperforate shaft for said rotor rotatably mounted in said casing, an inlet chamber in said casing for simultaneously introducing unfiltered liquid to a part of said radial passages under a differential of pressure, an outlet chamber extending around the major portion of the said socket to carry away filtered liquid discharging in said passages, and an inlet port in said casing adapted to register with at least one of the remaining passages for introducing a back wash fluid under pressure to remove solids from the filter pad.

HENRY B. FABER.
FRANCIS A. DE LISLE.